(12) United States Patent
Holme et al.

(10) Patent No.: US 8,501,367 B2
(45) Date of Patent: Aug. 6, 2013

(54) SILVER-COPPER-ZINC CATALYST FOR FUEL CELLS AND/OR ELECTROLYZERS

(75) Inventors: Timothy P. Holme, San Francisco, CA (US); Friedrich B. Prinz, Woodside, CA (US)

(73) Assignee: The Board of Trustees of the Leland Stanford Junior University, Palo Alto, CA (US)

(*) Notice: Subject to any disclaimer, the term of this patent is extended or adjusted under 35 U.S.C. 154(b) by 399 days.

(21) Appl. No.: 12/799,608

(22) Filed: Apr. 27, 2010

(65) Prior Publication Data

US 2011/0027689 A1 Feb. 3, 2011

Related U.S. Application Data

(60) Provisional application No. 61/215,397, filed on May 4, 2009.

(51) Int. Cl.
*B01J 23/89* (2006.01)
(52) U.S. Cl.
USPC .......................................................... 429/485
(58) Field of Classification Search
CPC .................................................... B01J 23/8953
USPC .............................................. 429/485, 487
See application file for complete search history.

(56) References Cited

U.S. PATENT DOCUMENTS

| | | | |
|---|---|---|---|
| 3,864,399 A | 2/1975 | McDowell et al. | |
| 7,351,444 B2 | 4/2008 | Wang et al. | |
| 7,422,994 B2 | 9/2008 | Chondroudis et al. | |
| 2002/0004453 A1 | 1/2002 | Haugen et al. | |
| 2004/0038808 A1* | 2/2004 | Hampden-Smith et al. | .. 502/180 |
| 2004/0161641 A1* | 8/2004 | Lee et al. | ......... 429/12 |

OTHER PUBLICATIONS

Chen et al., "Oxidation resistance of graphene-coated Cu and Cu-Ni alloy", 2010, arXiv:1011.3875.
Duhamel et al., "Synthesis and characterization of Ag doped Cu nanoparticles", 2008, pp. 191-195, Journal of Alloys and Compounds v460.
Li et al., "Sonochemical synthesis, structural and magnetic properties of air-stable Fe/Co alloy nanoparticles", pp. 1194-1199, New Journal of Chemistry v27, published Jun. 27, 2003.

* cited by examiner

*Primary Examiner* — Yogendra Gupta
*Assistant Examiner* — Alison Hindenlang
(74) *Attorney, Agent, or Firm* — Lumen Patent Firm

(57) ABSTRACT

Silver-copper-zinc compositions are employed as catalysts, e.g., for fuel cell and/or electrolyzer applications. These compositions have been experimentally tested in solid oxide fuel cell and proton exchange membrane fuel cell configurations. Such catalysts can be effective for both the anode and cathode half-reactions. A preferred composition range is $Ag_xCu_yZn_z$, where $0 \leq x \leq 0.1$, $0.2 \leq y \leq 0.5$, and $0.5 \leq z \leq 0.8$.

17 Claims, 6 Drawing Sheets

ND STATES PATENT

SILVER-COPPER-ZINC CATALYST FOR FUEL CELLS AND/OR ELECTROLYZERS

CROSS REFERENCE TO RELATED APPLICATIONS

This application claims the benefit of U.S. provisional patent application 61/215,397, filed on May 4, 2009, entitled "A silver-copper-zinc catalyst with high activity and poisoning tolerance", and hereby incorporated by reference in its entirety.

GOVERNMENT SPONSORSHIP

This invention was made with US government support under contract number N00014-08-1-0544 awarded by the Office of Naval Research. The government has certain rights in this invention.

FIELD OF THE INVENTION

This invention relates to catalysts, especially for fuel cell and/or electrolyzer applications.

BACKGROUND

A fuel cell is an electrochemical cell that converts the energy stored in a source fuel into electric current. An electrolyzer can be regarded as a fuel cell operated in reverse, where an electrical current is provided to drive electrochemical reactions (e.g., the dissociation of water into hydrogen and oxygen). For both fuel cells and electrolyzers, chemical catalysts are often utilized to provide important gains in performance.

Platinum catalysts are important in fuel cells and a wide range of industrial catalysis applications. Typical solid oxide fuel cells (SOFCs) are operated at temperatures above 700° C., at which temperature perovskite oxides are sufficiently active to serve as the cathode and perform the oxygen reduction reaction (ORR). It is desirable to operate SOFCs at lower temperatures, though at lower temperatures perovskites do not have sufficient catalytic activity and produce large voltage losses, thus new catalysts are actively being sought. In proton exchange membrane (PEM) fuel cells, platinum is a popular catalyst, and alternatives are usually platinum alloys with high Pt content.

Aside from cost, a further problem of platinum catalysts is their susceptibility to "poisoning" by strongly adsorbed gases. Since hydrogen is most often produced from fossil fuels, the fuel stream on the anode side of fuel cells often contains small amounts of hydrocarbons, sulfurous species, and a large number of other chemicals. Contamination of the fuel stream on the ppm level may result in catalyst poisoning. The most problematic fuel contaminants in terms of fuel cell performance are carbon monoxide and dihydrogen sulfide. These molecules react strongly with platinum and are difficult to remove. Alloys of Pt—Ru are more able to resist poisoning by CO, but still contain a large percentage of Pt. For intermediate temperature fuel cells, Ni is often used as the anode catalyst. Nickel is poisoned even more severely by CO and $H_2S$ than Pt is.

Another issue with platinum catalysts is that operation over time causes agglomeration of disperse nanoparticle Pt, which drastically lowers the activity by decreasing the amount of available surface area for electrochemical reaction and results in a diminishing performance over time. Due to the high cost of Pt and its tendency to be poisoned and degrade, alternatives to Pt catalysts are actively being sought.

Representative examples of the state of the art include U.S. Pat. No. 7,422,994, where PtCuW and oxides, carbides and salts thereof are considered as fuel cell catalysts. Another example is given in US 2002/0004453, where suboxides are employed as fuel cell catalysts. A further example is given in U.S. Pat. No. 7,351,444, where nano-structured layers of PtVCoNi alloys are employed as catalysts.

However, it remains desirable to provide catalysts having a good combination of low cost, high performance and resistance to poisoning, and it would be an advance in the art to provide such catalysts.

SUMMARY

Silver-copper-zinc compositions are employed as catalysts, e.g., for fuel cell and/or electrolyzer applications. A core-shell catalyst of Ag|Ag$_x$Cu$_{5-x}$Zn$_8$ was found, using density functional theory calculations, to have an electronic structure predicted to be near optimal for weak oxygen bonding, and the activation energy for dissociation was low. This catalyst was made via evaporation and sputtering and tested as the anode and cathode of low temperature solid oxide fuel cells. The new catalyst showed charge transfer resistance 16 times higher than platinum on the cathode side, and five times lower on the anode side at 400° C. The resistance to common catalyst poisons CO and $H_2S$ is enhanced compared to Pt. Further, the catalyst was tested as the cathode of a proton exchange membrane fuel cell by testing the half cell reaction in a rotating disk electrode. The exchange current density was within a factor of three lower than Pt, while the charge transfer coefficient was a factor of three higher than Pt. This approach is promising for providing a new catalyst that has acceptable performance, high morphological and chemical stability, and much lower cost than platinum (e.g., the above composition costs approximately 10,000 times less than Pt at January 2010 commodity prices).

More specifically, FIG. 1 shows part of a fuel cell or electrolyzer, where an electrolyte 102 is sandwiched between an anode 104 and a cathode 106. A catalyst 108 can disposed near electrolyte 102 to facilitate the anode half-reaction. A catalyst 110 can be disposed near electrolyte 102 to facilitate the cathode half-reaction. These catalysts include a composition consisting essentially of solver, copper and zinc. Embodiments of the invention can include such catalysts on both sides of the electrolyte (as shown), or on only the anode side or cathode side. As indicated in greater detail below, AgCuZn catalysts can be beneficial for both the anode half-reaction and the cathode half-reaction.

The AgCuZn composition is preferably Ag$_x$Cu$_y$Zn$_z$, where $0 \leq x \leq 0.1$, $0.3 \leq y \leq 0.55$, and $0.4 \leq z \leq 0.7$. This composition is more preferably Ag$_x$Cu$_y$Zn$_z$, where $0 \leq x \leq 0.1$, $0.2 \leq y \leq 0.5$, and $0.5 \leq z \leq 0.8$. This composition is still more preferably Ag$_x$Cu$_y$Zn$_z$, where $0 \leq x \leq 0.1$, $0.33 \leq y \leq 0.42$, and $0.58 \leq z \leq 0.67$. The basis for preferring these ranges is that they are at least approximately the result of a partial substitution of Ag for Cu in Cu$_5$Zn$_8$. The following paragraph provides an explanation of the importance of Ag substitution for Cu in Cu$_5$Zn$_8$ as presently understood.

Computational methods were used to study Pt catalysts and find a non-noble metal alternative. Atomic oxygen binding to the catalyst surface is used as a probe of catalytic activity. When the catalytic activity of transition metals is plotted against the binding energy of oxygen, a volcano shape curve results, indicating there is an optimum strength for the metal-oxygen bond. To construct a catalyst with an intermediate electronic structure, we alloy materials from each side of the peak in the volcano plot. We begin by selecting a low cost material from the left side of the peak and another from the right side; here, we chose Cu and Zn. On pure Cu and Zn, oxygen adsorbs strongly and forms an oxide. For binary combinations, oxygen adsorbs less strongly than on the pure components, but still too strongly for good catalytic activity. The best composition from the perspective of oxygen adsorption is a $Cu_5Zn_8$ alloy, which has the $Cu_5Zn_8$ prototype structure with space group I-43m. To further modify the catalyst, a near surface alloy was constructed by adding a third component. A single Cu or Zn atom at the adsorption site was substituted with either Ag or Ni, since they are both relatively low cost and lie on opposite sides of the volcano peak from each other. When Ag is substituted for Cu, the adsorption is much weaker: −0.74 eV, close to the desirable strength for operation at 400° C., −0.72 eV.

An important feature of these catalyst compositions is that they are stable in a standard air atmosphere (e.g., these AgCuZn compositions are not pyrophoric). AgCuZn having other compositions (e.g., as in U.S. Pat. No. 3,864,399) has been reported as being pyrophoric, i.e., will spontaneously ignite in air. The non-pyrophoric nature of the present AgCuZn compositions is advantageous because no special handling precautions (e.g., keeping the compositions immersed or under a reducing atmosphere) are necessary.

The catalysts of the present invention can be employed in any kind of fuel cell or electrolyzer. For example, solid oxide fuel cells and proton exchange membrane fuel cells can both make use of such catalysts. Similarly, solid oxide electrolyzers and proton exchange membrane electrolyzers can both make use of such catalysts.

In some embodiments, the catalysts at the anode side and/or cathode side of the electrolyte are fabricated as porous layers on the electrolyte surface(s). One approach for providing such porous layers is nanosphere lithography (NSL), and is described in greater detail below.

In preferred embodiments, a shell layer consisting essentially of silver is disposed to cover part or all of the AgCuZn composition. Such a shell layer preferably has a thickness of 2 nm or less. Suitable methods for depositing the shell layer include, but are not limited to: evaporation, atomic layer deposition, chemical vapor deposition, chemical bath deposition, electroplating and sputtering.

BRIEF DESCRIPTION OF THE DRAWINGS

FIG. 7b shows a Tafel plot relating to the data of FIG. 7a.

DETAILED DESCRIPTION

The following description relates to experimental fuel cell results for AgCuZn catalysts. A core-shell structure of Ag|$Ag_xCu_{5-x}Zn_8$, with a silver shell and $Ag_xCu_{5-x}Zn_8$ core, was fabricated with sputtering and evaporation and tested in SOFC operating environments. For comparison of methods of making the core-shell structure, both evaporation and sputtering were used to deposit the silver overlayer. For brevity, the $Ag_{0.02}Cu_{0.377}Zn_{0.603}$ catalyst with sputtered Ag overlayer will be referred to as C1 and with an evaporated overlayer as C2. We expect that the evaporated layer will be more uniform, and therefore have better performance.

More specifically, $Cu_5Zn_8$ and $Ag_{0.02}Cu_{0.377}Zn_{0.603}$ (both 99.99%, Kurt J. Lesker) targets were sputtered in a DC pulsed magnetron sputtering station. Nanosphere lithography (NSL) was used to make the bilayers porous, since sputtering at low power and high pressure produced dense films. Polycrystalline YSZ 100 μm-thick 1 cm×1 cm substrates (8% $Y_2O_3$ in $ZrO_2$, Marketech International) are prepared by a 5 min $O_2$ plasma clean before NSL spheres are deposited by Langmuir-Blodgett deposition.

Finally, the substrates are metallized by sputtering in Ar gas at 1 Pa and 100 W for 75 s, for which process the silica spheres act as a mask. To fabricate bilayers, sputtering and evaporation were used. For sputtered bilayers, the thin overlayer was sputtered for 2 s before and after the 75 s base layer. For evaporated bilayers, the thin overlayer of 1 nm was evaporated on top of the 75 s sputtered base layer. When sonicated in ethanol, the spheres detach from the substrate, and the metal that remains takes the negative pattern of the spheres.

Figure 1:
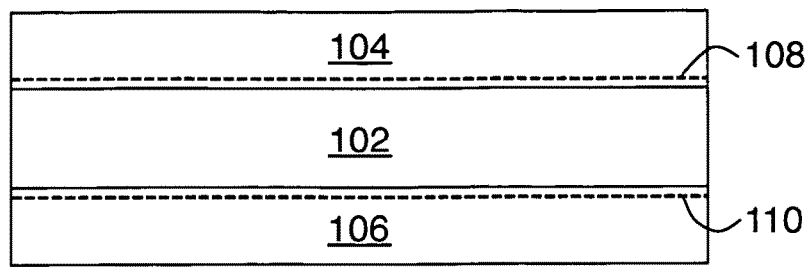
FIG. 1 shows an exemplary embodiment of the invention.
Figure 2A:
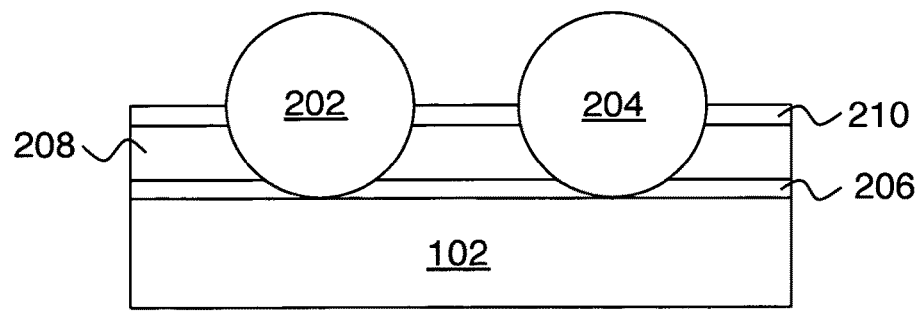
FIGS. 2a-d show examples of nanosphere lithography methods.
Figure 2B:
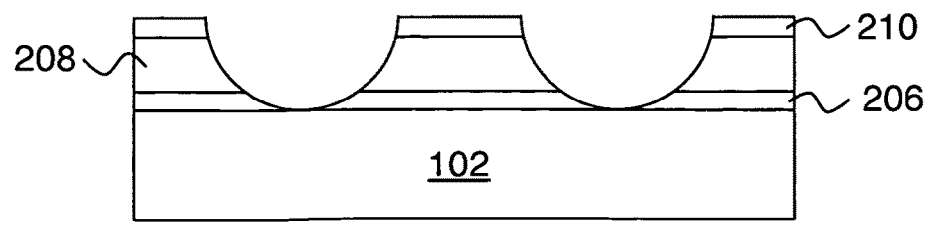
Figure 2C:
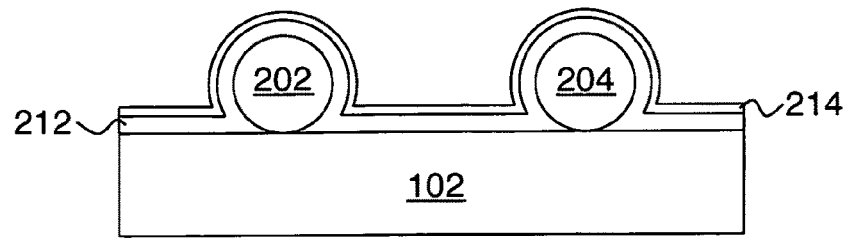
Figure 2D:
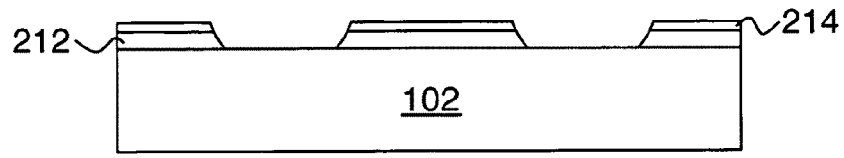

FIGS. 2a-d show these fabrication steps. On these figures, 102 is the YSZ substrate (i.e., fuel cell electrolyte), and 202 and 204 are silica nanospheres. FIGS. 2a-b show the above described sputtering process, where 206 and 210 are the Ag overlayer, each sputtered for 2 s, and 208 is the AgCuZn composition, sputtered for 75 s. After removal of the nanospheres, the resulting structure is shown on FIG. 2b. FIGS. 2c-d show the above-described evaporation process, where 212 is the base layer of AgCuZn sputtered for 75 s, and 214 is the 1 nm Ag overlayer evaporated on top of layer 212. After removal of the nanospheres, the resulting structure is shown on FIG. 2d.

Current-voltage performance, maximum power, and charge transfer resistance of the SOFC electrodes were measured over a wide temperature range. SOFCs were measured by flowing pure, dry $H_2$ at 13 sccm to the anode chamber and exposing the cathode to air. The fuel cells were heated from below to 150-400° C. Linear sweep voltammetry and electrical impedance spectroscopy was taken by a Gamry FAS2 femtostat after the open circuit voltage had stabilized, to ensure thermal equilibrium was reached. iV curves were measured at 5 mV/s, and for EIS a 50 mV rms AC perturbation was applied at DC voltages from 1.0 to 0.2 V versus the anode. The EIS signal was fit to an equivalent circuit of three parallel resistor plus constant phase element (CPE) segments, where the R-CPE with a low frequency time constant is representative of processes occurring at the cathode and the intermediate frequency signal is primarily due to the anode. For poisoning experiments, 40 ppm $H_2S$ or 100 ppm CO (balance nitrogen) was added to the anode fuel stream for electrochemical measurements. The XPS measurements of binding energy were taken on an SSI S-Probe Monochromatized XPS Spectrometer, which uses Al(kα) radiation (1486 eV) as a probe. Measurements were taken after a 20 s Ar etch to remove any surface contamination layer.

Figure 3A:
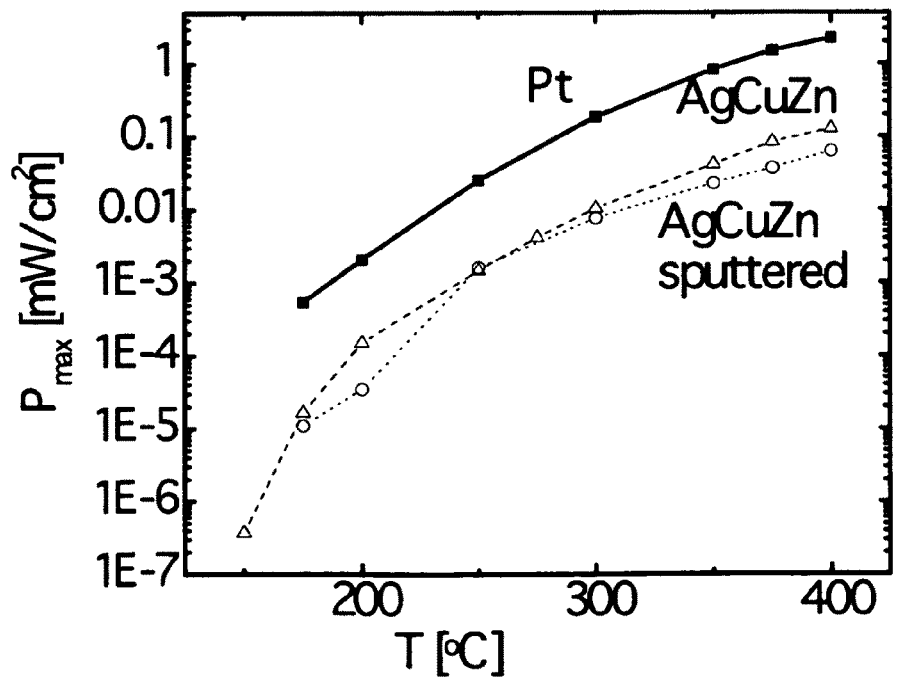
FIGS. 3a-b show experimental results relating to AgCuZn catalysts.
Figure 3B:
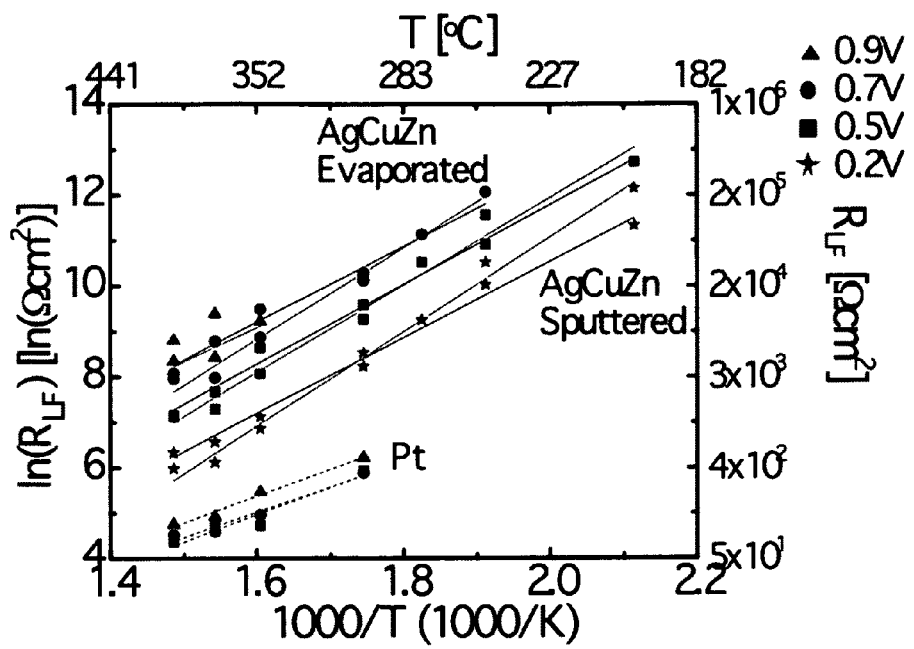

FIGS. 3a-b show the performance of Pt, C1, and C2 as SOFC cathodes. C1 and C2 have a peak power density approximately one order of magnitude lower than Pt across the temperature range, with C2 generally performing slightly better than C1. To investigate the cause of the lower power density, electrochemical impedance spectroscopy(EIS) was performed. A Nyquist plot of EIS spectra for SOFCs typically shows three distinct loops, where the loop at low frequency is dominated by processes occurring at the cathode. Therefore, the resistance extracted from the low frequency loop is a measure of the cathode performance. FIG. 3b shows a charge transfer resistance one to three orders of magnitude higher for C1 and C2 than Pt. The following Table 1 shows the activation energy ($E_a$) extracted from the Arrhenius plots is higher for C2 and C1 than Pt. The higher resistance may be due to a lower density of active sites in the C2 catalyst due to the way it was deposited.

TABLE 1

Activation energy of low frequency resistance for cathode catalysts C1, C2, and Pt

| V vs. anode [V] | C1 $E_a$ (eV) | C2 $E_a$ (eV) | Pt $E_a$ (eV) |
|---|---|---|---|
| 0.2 | 0.72 | 0.9 | |
| 0.5 | 0.76 | 0.83 | 0.52 |
| 0.7 | 0.72 | 0.87 | 0.48 |
| 0.9 | | 0.64 | 0.51 |

The observed oxidation of AgCuZn catalysts at high temperatures may result from the fact that the energy of dissociated oxygen 2O* on AgCuZn is −3.2 eV, whereas on Pt it is −2.6 eV. The oxygen is bound more tightly to the surface of AgCuZn, making oxidation more likely. The geometry of the dissociated state has been investigated, and shows that the dissociated atoms move away from the silver atom, explaining why the bond is stronger. This is additional evidence that imperfect coverage of the silver overlayer on the CuZn underlayer can lead to oxidation and lower performance. Electroplating or atomic layer deposition of silver may be the best techniques to deposit thin and conformal layers. We hope that progress along those lines may yield improved results.

During testing, it was found that Ag in the overlayer tends to migrate away from the surface layers. XPS testing of the surface of samples before and after testing as a fuel cell showed that the Ag deposited on top of $Cu_5Zn_8$ was no longer found on the surface after testing at elevated temperatures. The quantum simulations predicted that Ag would be energetically driven to the surface, so we posit that the migration is a result of entropic effects. The configurational entropy to be gained by some diffusion of Ag across the very high concentration gradient at the bilayer would result in silver diffusion away from the surface. A second possibility exists: the higher affinity for oxygen of copper and zinc compared to silver could provide a driving force for Cu and Zn to displace Ag at the surface in environments of high oxygen activity. This effect would still be present in a bilayer sample where the underlayer contains silver, as in Ag|$Ag_xCu_{5-x}Zn_8$, though the entropic effect would be reduced. Considering the much improved performance of the Ag|$Ag_xCu_{5-x}Zn_8$ compared to Ag|$Cu_5Zn_8$, we speculate that the oxygen chemistry plays a lesser role in silver diffusion than entropic effects.

Yet another possibility to explain the loss of silver from the surface of the bilayer films when exposed to high temperatures in air is the vaporization of silver, either as Ag or $Ag_2O$. The melting point of Ag, 962° C., is much higher than temperatures approached in experiments, so we find it unlikely that much silver vaporizes in experiments. Vaporization of the phase $Ag_2O$ is another route of silver loss, but $Ag_2O$ decomposes at 150° C. to silver and gaseous oxygen, so it is unlikely to form under the conditions tested. To mitigate silver diffusion into the bulk, samples with a bilayer of Ag|$Ag_xCu_{5-x}Zn_8$ are used rather than Ag|$Cu_5Zn_8$.

Figure 4A:
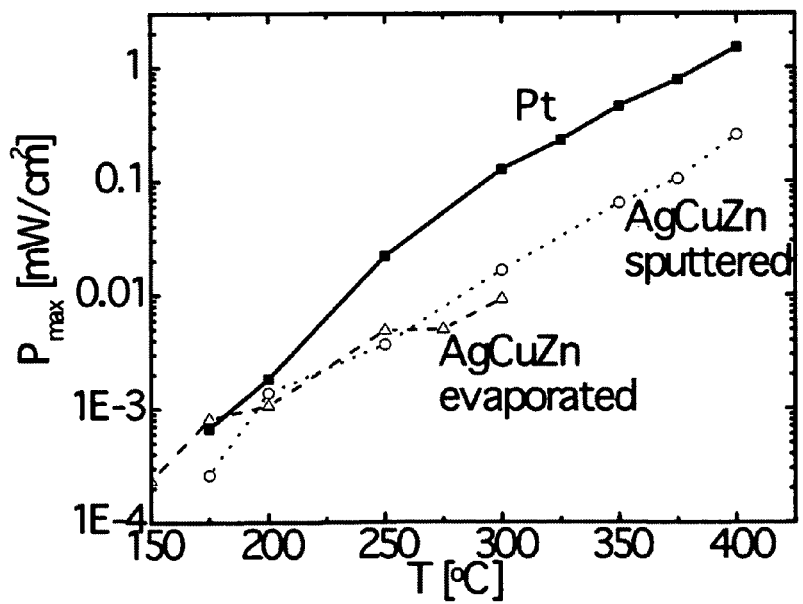
FIGS. 4a-c show further experimental results relating to AgCuZn catalysts.
Figure 4B:
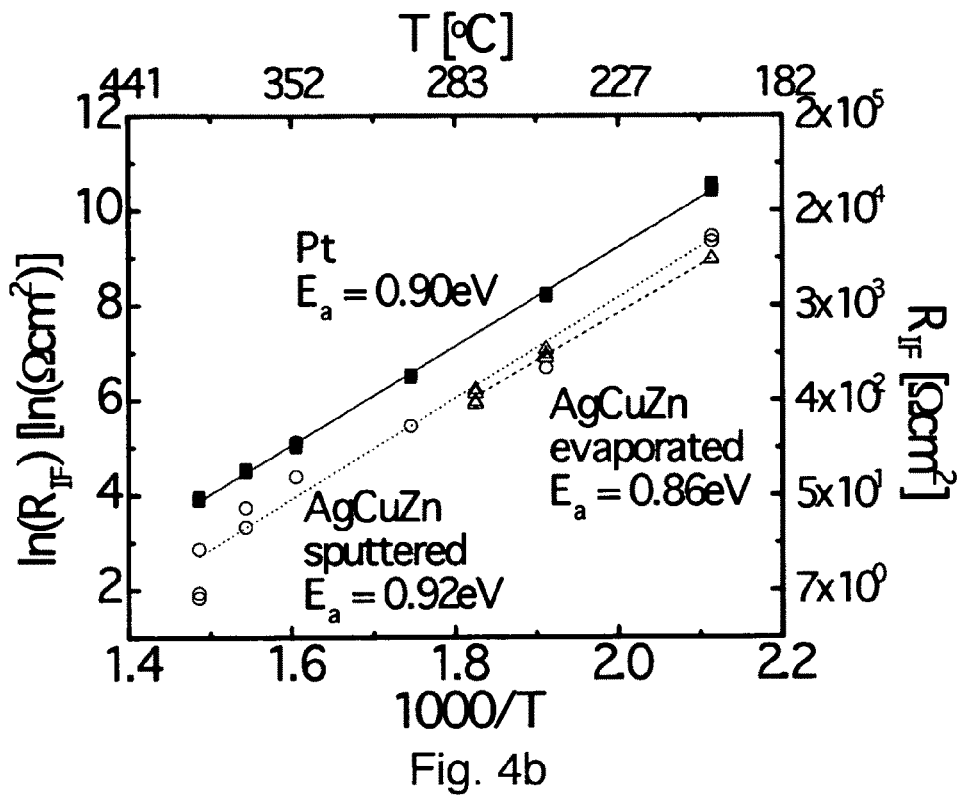
Figure 4C:
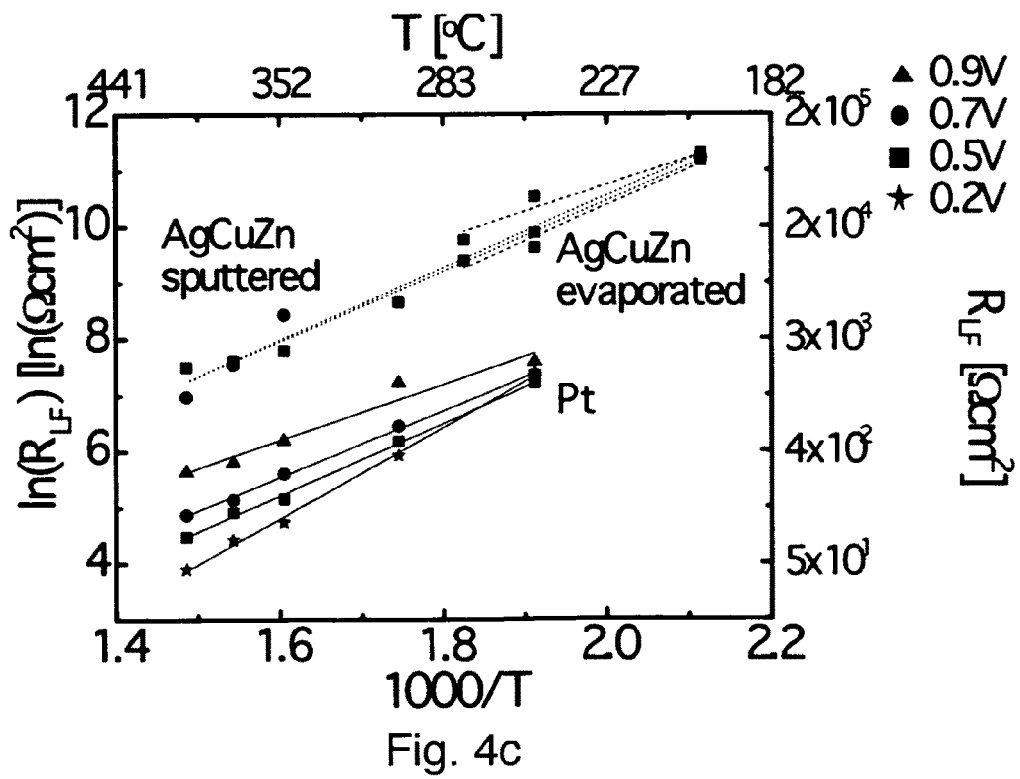

NSL anodes of bilayers C1 and C2 were also made for comparison to Pt anodes. The three samples had Pt cathodes for reference. As shown in FIGS. 4a-c, the peak power density of C1 and C2 anodes is roughly a factor of 5×0 lower than Pt anodes at high temperature, but at low temperature, the peak power density is comparable, and even is higher for C2 at 175° C. To ensure that this is not an artifact of thermal lag in the system, the open circuit voltage (OCV) was measured for minutes during stabilization at elevated temperatures before the iV curve was taken. The Pt sample was given the longest time to equilibrate, and the very stable OCV shows that it had reached thermal equilibrium prior to iV measurement.

The intermediate frequency resistance in FIG. 4b demonstrates the improved performance of the anode C2 and C1 catalysts compared to Pt. The intermediate frequency resistance is dominated by anode reactions, and while the activation energies are similar for the three samples, as shown on Table 2 below, the resistances are lowest on C1 and C2. It is unknown whether this improvement results from weaker binding of water or increased kinetics of OH or $H_2O$ formation.

TABLE 2

Activation energy of low frequency resistance for anode catalysts C1, C2, and Pt

| V vs. anode [V] | C1 $E_a$ (eV) | C2 $E_a$ (eV) | Pt $E_a$ (eV) |
|---|---|---|---|
| 0.2 | | 0.55 | 0.70 |
| 0.5 | 0.54 | 0.41 | 0.55 |
| 0.7 | 0.55 | | 0.51 |
| 0.9 | | | 0.43 |

FIG. 4c shows that the low frequency resistance, which is the largest resistance in the circuit, is much lower for Pt than C1 or C2. The activation energies in Table 2 are all comparable, which is compatible with an interpretation that the limiting reaction step is on the cathode, for which all samples employ Pt. If the activation energy is similar but the overall rate of the reaction is lower, that indicates that the attempt frequency is lower. The difference in attempt frequency may result from having fewer reactants available, for example if the overall rate limiting step lies elsewhere in the fuel cell, fewer reactants will be supplied.

Since AgCuZn materials are promising as anode catalysts, they were evaluated for tolerance to poisoning. To test poisoning tolerance, the catalyst was exposed to controlled doses of CO and $H_2S$ poisons during operation, and the performance degradation was quantified. Tests of anode catalyst tolerance to poisoning were performed by mixing a dilute mixture of 100 ppm CO (balance $N_2$) with the flow of dry $H_2$ to the anode side of the fuel cell with the cathode exposed to air at 175° C. An initial background test was performed with a flow rate of 13 sccm $H_2$ before exposure to CO. Current-voltage curves were measured, and EIS was performed at various DC bias voltages. Two loops were seen in EIS, as is typical for temperatures below 250° C. Next, 1 sccm of the dilute CO mixture was flown for 100 s with the fuel cell at OCV, then the voltage was allowed to recover after the CO flow was ceased. Current-voltage and EIS measurements were taken. Next, 1 sccm of CO was used during iV and EIS measurements, and finally, 13 sccm of CO was used during iV and EIS measurements.

Figure 5:
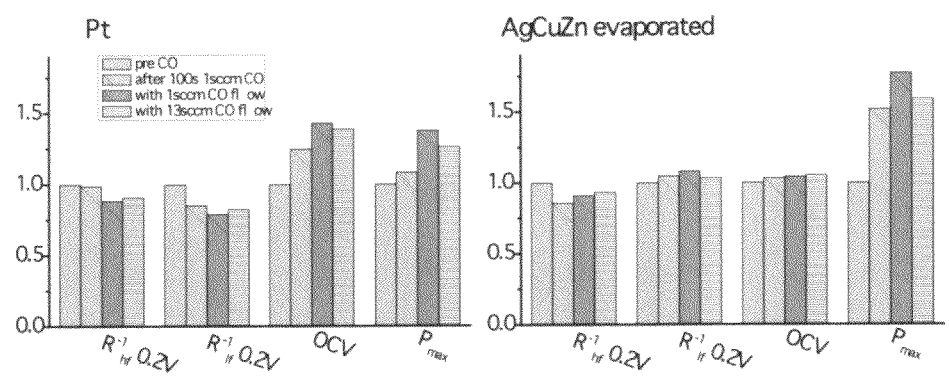
FIG. 5 shows experimental results relating to catalyst poisoning by CO.

The results are shown in FIG. 5. All quantities on this figure are normalized to pre-exposure values. For Pt anodes, the resistances increase for the first two exposures and slightly decrease for the higher flow rate of CO. Increases are on the order of 10-25%. The reason for the decreased resistance at higher CO flow is unknown. The OCV also increases with increasing CO exposure, presumably because CO is used as a fuel

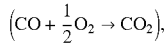

and a higher activity of fuel produces a higher OCV, but again, the decrease in OCV at higher flow is unknown. Another possible contribution to the increased OCV with CO flow is that the higher gas flow sweeps water out of the anode more quickly; the decreased activity of water at the anode would slightly increase the OCV. The maximum power density follows the same trend as the OCV, but increases less because resistances also increase to a lesser degree.

For the Ag|$Ag_xCu_{5-x}Zn_8$ sample, the OCV increases by a lesser degree than for Pt, but the resistances also increase less. The high frequency resistance increases by at most 17%, while the low frequency resistance actually decreases slightly. The power density increases due to the increased OCV and decreased resistance. It is concluded that the Ag|$Ag_xCu_{5-x}Zn_8$ anode is more resistant to CO poisoning than Pt.

$H_2S$ tolerance was tested for Pt and Ag|$Ag_xCu_{5-x}Zn_8$. According to the results of simulations, $H_2S$ adsorbs strongly on Pt and Ni, and less strongly on Ag|$Ag_xCu_{5-x}Zn_8$. On the basis of these simulations, Ag|$Ag_xCu_{5-x}Zn_8$ is expected to be more tolerant to $H_2S$ exposure. Simulations have been performed for sulfur species adsorbing on Ni, and showing very strong adsorption strengths of atomic S from 1-5 eV. Likewise, atomic S adsorbs on Pt(111) with exothermicity ~5 eV and $H_2S$ on Pt(111) with 0.70 eV, in excellent agreement with the value found in this work.

Figure 6:
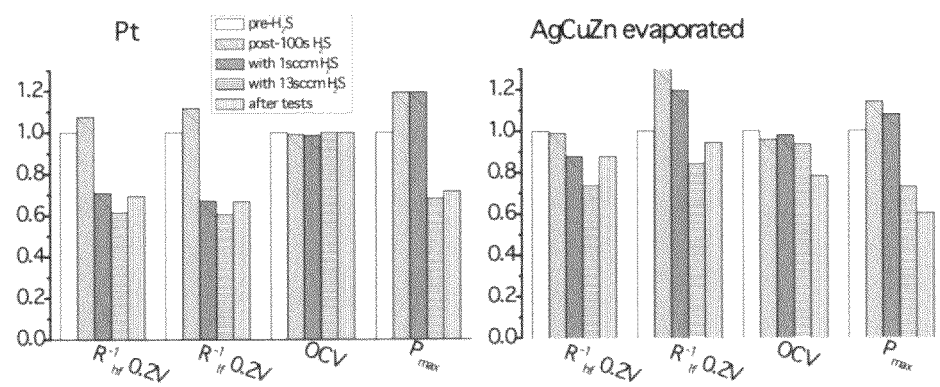
FIG. 6 shows experimental results relating to catalyst poisoning by $H_2S$.

To experimentally test the prediction of the simulation, the same battery of tests was performed on Ag|$Ag_xCu_{5-x}Zn_8$ anodes and Pt anodes. A dilute mixture of 60 ppm $H_2S$ (balance $N_2$) was used for a limited exposure of 100 s, then a continuous flow of 1 sccm and 13 sccm. Finally, the $H_2S$ flow was shut off and iV and EIS measurements were taken afterwards to see if the anodes could recover from the tests. On Pt anodes, a short exposure to $H_2S$ does not adversely affect performance. On the contrary, resistances decrease and the maximum power increases. We speculate that this is due to a thermal equilibration lag, so that the fuel cell was still warming as the measurements were taken, and therefore the performance improved between the two tests. During and after prolonged exposure to $H_2S$, the resistances of the anodes increase by 65%. The open circuit voltage is constant for all tests, showing that 1) $H_2S$ is not used as a fuel and 2) the effect of sweeping water out of the anode with increased gas flow is minor. The poisoning has a prolonged effect on Pt anodes; the performance does not significantly change between the exposure to 13 sccm $H_2S$ and long after (>10 minutes) the flow is discontinued. These results are shown on FIG. 6. All quantities on this figure are normalized to pre-exposure values.

The experimental results above agree with what has been found previously for $H_2S$ adsorption on Ni. The SOFC performance goes down upon exposure to $H_2S$, which is initially recoverable by discontinuing the flow of $H_2S$, but becomes permanent upon prolonged exposure.

In contrast, Ag|$Ag_xCu_{5-x}Zn_8$ anodes show improved resistance to $H_2S$. During exposure to 1 sccm $H_2S$ the low frequency resistance decreases. In the worst case, the high frequency resistance increases by 36%. These results are explained by the prediction from the simulations of weaker interaction with $H_2S$, as well as the thermodynamics of sulfide formation.

Thermodynamics of sulfide formation energy demonstrate that Ag and Cu form weaker sulfides than Pt. While Zn forms a strong sulfide, if a true bilayer structure is achieved with Ag on the surface, Zn should not be exposed to $H_2S$. As the formation energy of $H_2S$ is −0.21 eV, there is little driving force for sulfide formation with Ag (−0.13 eV).

Finally, a rotating disk electrode (RDE) half-cell aqueous electrochemistry measurement was done to probe catalyst activity in proton exchange membrane (PEM) fuel cell environments. RDE measurements were performed at room temperature in a 0.1M perchloric acid solution. The working electrode, attached to the catalyst via a glassy carbon frit, was scanned versus a Pt wire counter electrode and referenced to a Hg/$HgSO_4$ reference electrode (−0.715V vs. normal hydrogen electrode (NHE)). Oxygen was bubbled through the solution through a porous frit for at least ten minutes before the measurement started to ensure the solution was saturated with oxygen. The Pt catalyst was conditioned by scanning 1500 times from −0.67 to 0.38 V versus the reference electrode. The RDE was rotated at 1600 rpm. Ohmic losses through the solution were 21 Ω, and for cyclic voltammetry (CV) measurements, IR compensation was performed at 85%.

Figure 7A:
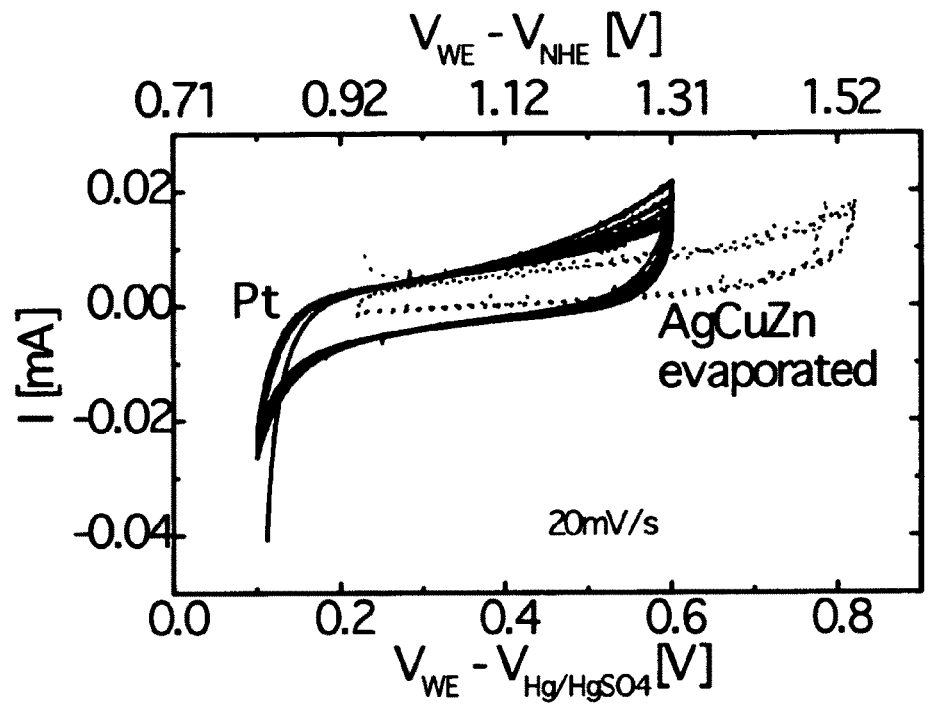
FIG. 7a shows current-voltage data relating to a proton exchange membrane fuel cell including an AgCuZn catalyst.
Figure 7B:
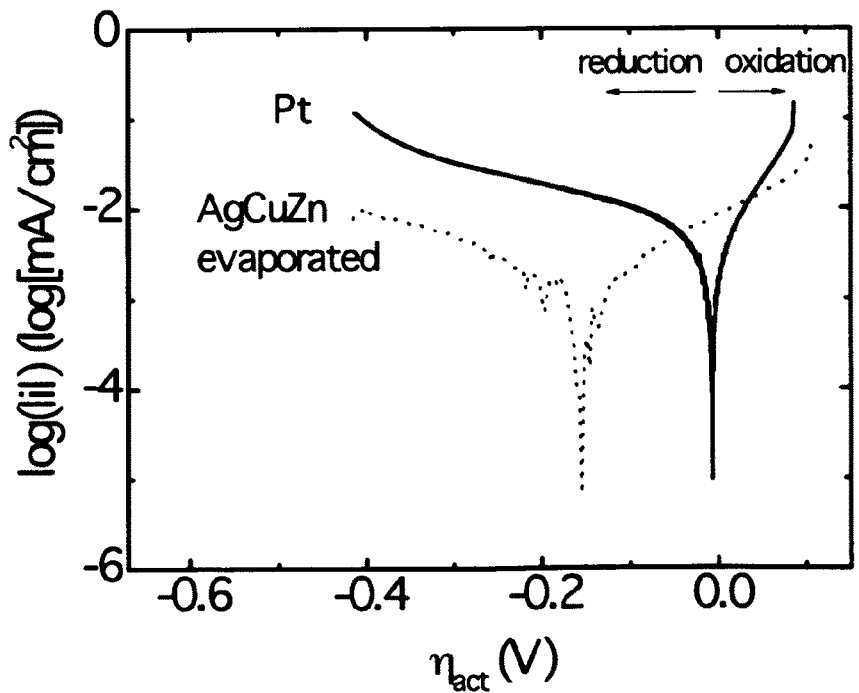

The oxygen reduction reaction, shown in FIG. 7a, may be performed on C2, and activity is comparable, though lower than on Pt. A Tafel plot in FIG. 7b quantifies the exchange current density as $j_o \approx 6 \times 10^{-6}$ A/cm$^2$ for Pt and $2 \times 10^{-6}$ A/cm$^2$ for C2. The charge transfer coefficient was found to be $\alpha \approx 0.01$ for Pt and 0.03 for C2. The onset of the reduction reaction is at a more negative potential on C2, which may be due to the hysteresis in the CV scan.

The invention claimed is:

1. Apparatus comprising:
   an anode;
   a cathode;
   an electrolyte sandwiched between said anode cathode; and
   a first catalyst disposed in proximity to said electrolyte to facilitate at least one of a cathode half-reaction and an anode half-reaction;
   wherein said first catalyst comprises a composition consisting essentially of silver, copper and zinc;
   wherein said composition is $Ag_xCu_yZn_z$, wherein $0 \leq x \leq 0.1$, $0.2 \leq y \leq 0.5$, and $0.5 \leq z \leq 0.8$.

2. The apparatus of claim 1, wherein said composition is $Ag_xCu_yZn_z$, wherein $0 \leq x \leq 0.1$, $0.33 \leq y \leq 0.42$, and $0.58 \leq z \leq 0.67$.

3. The apparatus of claim 1, wherein said composition comprises a partial substitution of Ag for Cu in Cu in $Cu_5Zn_8$.

4. The apparatus of claim 1, wherein said composition is stable in a standard air atmosphere.

5. The apparatus of claim 1, wherein said first catalyst is disposed to facilitate said anode half-reaction.

6. The apparatus of claim 1, wherein said first catalyst is disposed to facilitate said cathode half-reaction.

7. A fuel cell comprising the apparatus of claim 1.

8. The apparatus of claim 7, wherein said fuel cell is a solid oxide fuel cell or a proton exchange membrane fuel cell.

9. An electrolyzer comprising the apparatus of claim 1.

10. The apparatus of claim 9, wherein said electrolyzer is a solid oxide electrolyzer or a proton exchange membrane electrolyzer.

11. The apparatus of claim 1, wherein said first catalyst is a porous layer fabricated on a surface of said electrolyte.

12. The apparatus of claim 1, wherein said first catalyst further comprises a shell layer disposed on part or all of said composition and consisting essentially of silver.

13. The apparatus of claim 12, wherein said shell layer has a thickness of 2 nm or less.

14. The apparatus of claim 12, wherein said shell layer is deposited with a method selected from the group consisting of evaporation, atomic layer deposition, chemical vapor deposition, chemical bath deposition, electroplating and sputtering.

15. The apparatus of claim 1, further comprising:
   a second catalyst disposed in proximity to said electrolyte to facilitate at least one of a cathode half-reaction and an anode half-reaction;
   wherein said second catalyst comprises a composition consisting essentially of silver, copper and zinc.

16. The apparatus of claim 15, wherein one of said first and second catalysts is disposed to facilitate said cathode half-reaction and another of said first and second catalysts is disposed to facilitate said anode half-reaction.

17. A catalyst composition consisting essentially of $Ag_x Cu_y Zn_z$, wherein $0 \leq x \leq 0.1$, $0.33 \leq y \leq 0.42$, and $0.58 \leq z \leq 0.67$.

\* \* \* \* \*